Patented Nov. 24, 1931

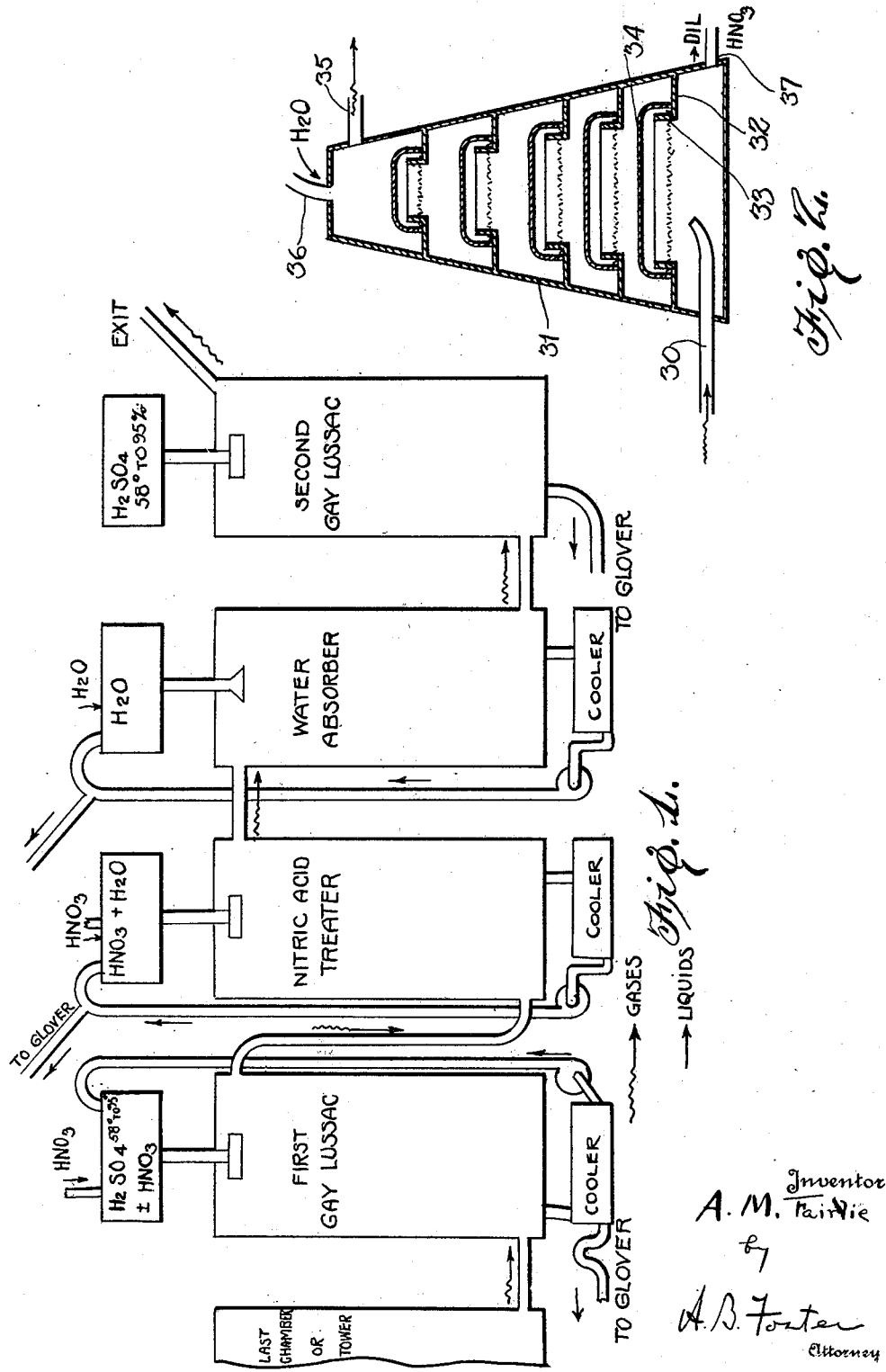

1,833,418

UNITED STATES PATENT OFFICE

ANDREW M. FAIRLIE, OF ATLANTA, GEORGIA

RECOVERY OF OXIDES OF NITROGEN IN SULPHURIC ACID MANUFACTURE

Application filed September 16, 1926. Serial No. 135,864.

The present invention relates to improvements in the manufacture of sulphuric acid by processes involving the use of nitrogen-oxygen compounds, such as oxides of nitrogen or nitric acid, as the intermediary or catalytic agent for the oxidation of sulphur dioxide. The invention of the present case is an improvement upon the disclosure of my prior U. S. Patent 1,420,477, reissued, Aug. 23, 1927, as Reissue 16,709. The invention of the present application is, while of general application, particularly suitable for those cases where the character of the $SO_2$-containing gases introduced into the system varies a good deal from time to time, and especially when the $SO_2$ content of the said gases varies a good deal from time to time. As illustrative of such cases, I refer particularly to the use of gases from pyritic smelting, in which the blast furnace is fed at rather long intervals.

The process of the present case is applicable not only as regards lead chamber processes, but also as regards the use of towers, mixing boxes, centrifugal washers, or any other gas-liquid contacting apparatus, used in place of chambers. Reference will hereinafter be made to chambers, but the process is to be understood as being applicable to towers or other apparatus for contacting liquid with gas as well.

As stated in my patent above referred to, the gases leaving the last lead chamber of properly conducted sulphuric acid plant should preferably contain a small amount of $SO_2$, say about 0.05 per cent up to 0.15 per cent, by volume, if such gases as the next step, are to be subjected to treatment with sulphuric acid as in a Gay Lussac tower. It is not always possible to prevent the amount of $SO_2$ from materially exceeding the highest figure here given, and in order to prevent trouble from this excess of $SO_2$ in the gases, I oxidize the $SO_2$ present by use of nitric acid, which may be preformed in a number of different ways, or by a combination of these ways, after which I recover the oxides of nitrogen in the gases, either by washing with water or weak nitric acid followed by water, or I may employ a second Gay Lussac tower for this purpose.

Fig. 1 of the accompanying drawings represents diagrammatically apparatus which may be used for carrying out the process of the present application, although it is understood that the invention is not restricted to the use of this apparatus.

The gases leaving the last chamber or its equivalent may first be passed through a Gay Lussac tower, and in this tower the gases may be contacted with sulphuric acid of the strength ordinarily employed in Gay Lussac tower treatment, say about 58 to 60° Baumé, or a stronger acid even up to 95% $H_2SO_4$ if available, may be used, and in order to oxidize the $SO_2$ still in the gases, I may also introduce into this tower nitric acid, and may use an amount of nitric acid in this tower sufficient to completely oxidize the $SO_2$. A substantial excess of nitric acid over this quantity may be used, and it will be understood that the use of such excess of nitric acid is not wasteful, because the outlet liquid from this Gay Lussac tower may be recirculated through the same tower, and in any event, it is eventually passed through the Glover tower, in which any nitric acid contained in the said liquid would be decomposed by the hot strong $SO_2$ in the incoming gases. I have here referred to introducing nitric acid into the Gay Lussac tower, and it will be understood that this can be introduced as such, or in the form of a nitrate, which upon contact with the sulphuric acid would be converted into nitric acid, sodium nitrate, calcium nitrate, and the like being mentioned as examples.

Without restricting myself to proportions, I mention here that I may add 0.1 to 3% or more of nitric acid (or an equivalent amount of nitrate) to sulphuric acid of say 58–60° strength, or to stronger sulphuric acid say 66° if available to be introduced into the Gay Lussac tower, the exit liquid passing to the Glover tower, without recirculation in the Gay Lussac. Or for example, I may add 5 to 10% of nitric acid (or an equivalent amount of nitrate) to the sulphuric acid to enter the Gay Lussac tower, and recirculate this liquid in the latter tower until its HNO₃ content is reduced to say 0.1 to 1.5%, and then pass this liquid to the Glover tower.

It is more or less immaterial whether the absorption of higher oxides of nitrogen is completed in this first Gay Lussac tower, because the exit gases therefrom have to be further treated for the recovery of nitrogen compounds contained therein.

Instead of adding nitric acid to the sulphuric acid fed to a Gay Lussac tower, the gases leaving the last lead chamber may be given a nitric acid treatment in a separate tower or other apparatus, and this separate tower or apparatus may be either before or after the first Gay-Lussac tower. In case of such separate nitric acid treatment, the gases leaving the first Gay Lussac tower (or the gases from the last chamber or its equivalent), are passed into a device in which they are treated with nitric acid, preferably being a nitric acid of higher concentration than would be produced by a simple washing of the gases once with water. The liquid used in this step may be and preferably is recirculated, at least in part, and either continuously or intermittently additional quantities of nitric acid (or nitrate) are added to the said liquid. Since the recirculated liquid contains sulphuric acid in considerable quantity, partly carried with the gas stream as a mist and partly formed from SO₂ by the nitric acid treatment, any nitrate added to the recirculating liquid will be promptly acted upon by such sulphuric acid to form nitric acid. The effect of this nitric acid is to substantially completely oxidize the SO₂ carried in the gases so that the lower oxides of nitrogen contained in the gases can readily oxidize to higher oxides in order to be more completely absorbed in the later parts of the system.

Without restricting myself to proportions, I mention by way of example that the liquid introduced into the nitric acid treater may initially contain water with 2 to 5% or even 10% of HNO₃ (or an equivalent amount of nitrate), and can be recirculated therein, while constantly withdrawing a part (say one tenth) of the said liquor, either to a Glover tower or elsewhere in the early part of the system, additional amounts of HNO₃ and either water or liquid from the water absorber being added to make up for that withdrawn.

The gases leaving the nitric acid treater will be substantially free from SO₂, and will ordinarily contain a sufficient amount of oxygen to readily oxidize the lower oxides of nitrogen therein into higher oxides of nitrogen. These gases may then be passed through a water absorber, or a series of water absorbers, and after these water absorbers, if a series of the same are used, the water can pass first through the later absorber of the series and then through the earlier absorbers of the series, and the water can be recirculated, in part at least, if desired, in each of the absorbers. If several absorbers are used, it is preferable to introduce water in the last absorber of the series, then the outflow from that one into next to the last and so on until it reaches the first absorber, and any or all of these absorbers may be provided with recirculating systems as shown in the drawings. The gases and the absorbing liquid (water or dilute nitric acid) may pass countercurrent in each absorber, or cocurrent as desired, or they may pass countercurrent in some of the absorbers and cocurrent in other absorbers. The water absorbers may be filled towers, or may be towers not provided with any filling material, and provided with atomizers or other devices for bringing the gases and liquid into intimate contact with each other. Bubbling towers may be employed in this step of the process, as illustrated in Fig. 2 of the drawings.

As illustrated in Fig. 2 the bubbling towers may be more or less cone shaped, although vertical walled towers could be employed. The gases enter through pipe 30 and pass up through the several sections of the column, bubbling through the liquid in each of the several trays 32 which have upstanding inner flanges 33, and are provided with covers 34, the edges of which may be serrated and dip into the liquid in the several trays. The gases pass out at 35, water or dilute nitric acid being introduced at 36, and nitric acid of more or less concentration passing out through pipe 37. The particular object in making these columns tapering as shown in Fig. 2 is for cooling the gases and liquid in said columns, by external cooling, say by water or other liquid.

If a considerable number of water absorbers are employed, the oxides of nitrogen may be removed completely or substantially completely, by absorption in water. In some cases however, it is found more advisable to absorb all or a portion of the oxides of nitrogen in a second Gay Lussac tower, which may be of the usual or any approved type, fed with strong sulphuric acid, say 58 to 60° Baumé, or a considerably stronger acid, if available, even up to 66° Baumé can be employed.

The gases from the second Gay Lussac tower can be allowed to escape into the atmosphere or into a suitable chimney, or they may be further treated for the recovery of residual oxides of nitrogen.

The use of acid considerably above 60° Baumé, if the same is available is of very substantial importance, as producing a much more complete absorption of the oxides of nitrogen from the gases.

The exit liquid from the first Gay Lussac tower, and that portion of the exit liquid from the nitric acid treater which is not to be recirculated in said device, and the acid from the second Gay Lussac tower are preferably led back into the Glover tower or Glover towers of the sulphuric acid system. As alternatives, (a) the outflow from the nitric acid treater may be injected into one or more of the lead chambers (or their equivalent) through atomizers; and (b) the outflow from the second Gay-Lussac tower may be used as feed for the first one. The dilute nitric acid produced in the water absorber, or that part of it which is not recirculated, can likewise be conveyed back to the Glover tower, or can be introduced into the lead chambers or at other places in the sulphuric acid system, particularly when towers are employed instead of chambers.

The first Gay Lussac tower, the nitric acid treater and also the water absorber should preferably be made of material resistant to nitric acid. For this purpose suitable refractory ceramic ware can be employed. For the nitric acid treater and water absorbers I prefer alloys of iron and silicon or alloys of iron and chromium. The material commercially known as "Duriron" is suitable for said purpose, and in some respects is better than ceramic ware, as it is easy to cool the same from the outside, by a suitable spray of cold water. Such Fe-Cr alloys as duralloy and ascoloy are also suitable, and in some cases chromium plated metal may be used. There is a decided advantage in cooling the first Gay Lussac tower, the nitric acid treater and the water absorber by any suitable means, such as by external water spraying, since the reaction goes on more effectively if the liquid in the devices is kept cooled, and if the gases in the devices are kept cooled.

It will be understood that the supply tanks illustrated above the several towers may be provided with suitable cooling coils or other cooling devices, for cooling the liquid therein, before introducing the same into said towers. Or the liquid discharged from a tower may be passed through a cooler located below said tower, prior to reentry into a tower.

I have above referred to the special utility of the present invention, in treating gases of variable $SO_2$ content, in the making of sulphuric acid. By making periodic tests, to show the presence of nitric acid in the exit liquid from the first Gay Lussac tower or from the nitric acid treater, the operator will be positive that the system is properly functioning, when nitric acid is shown to be present in the exit liquid. If it is found at any time that nitric acid is not present in the exit liquid, additional supplies of nitric acid to the first Gay Lussac or to the nitric acid treater can at once be made.

In the drawings, I have indicated the feeding to the first Gay Lussac and to the nitric acid treater, of preformed mixtures, these mixtures preferably being already cooled to about room temperature. I call attention however to the possibility of separately leading the nitric acid and the sulphuric acid into the first Gay Lussac tower or separately leading in the recirculating liquid and the added acid to the nitric acid treater. It would also be possible to allow the streams of the separate liquids to come into contact with each other first inside of the said towers.

I call attention to the fact that additional Gay Lussac towers, operated in the usual manner can be placed before the "first Gay Lussac" shown in the drawings, and in fact a series of Gay Lussac towers may be used, the nitric acid being introduced into a Gay Lussac tower before the last one.

In certain instances it might be advisable to carry the gases down drafted through the final Gay Lussac tower and introduce some nitric acid with the sulphuric acid therein, or the final Gay Lussac tower may be fed in the usual manner with the gases at the bottom and the liquid at the top, the liquid in this event also carrying some nitric acid, and this being followed by a water absorber for absorbing the oxides of nitrogen.

I recommend in all cases that the Gay Lussac tower to which the nitric and sulphric acids are fed be followed by a suitable absorption treatment for nitrogen oxides, as this treatment means treatment with water, or treatment with water followed by treatment with sulphuric acid, or treatment with sulphuric acid followed by treatment with water. This recommendation applies especially to the Gay Lussac tower to which the nitric and sulphuric acids are fed first, second, third, or any other, or even final Gay Lussac tower of the series.

I claim:

1. In a process of making sulphuric acid by the use of nitrogen compounds, the herein described step of feeding to a Gay Lussac tower, sulphuric acid of a strength adapted to absorb higher oxides of nitrogen, and also nitric acid, whereby any $SO_2$ in the gases passing through such Gay-Lussac tower will be promptly oxidized.

2. In a process of making sulphuric acid by the use of nitrogen compounds, the herein described step of feeding to a Gay Lussac tower, sulphuric acid of a strength adapted to absorb higher oxides of nitrogen, and also a solution containing from 0.1 to 10 per cent of nitric acid, whereby any $SO_2$ in the Gay Lussac gases will be promptly oxidized.

3. In a process of making sulphuric acid by the use of nitrogen compounds, the herein described step of feeding to a Gay Lussac tower, sulphuric acid of a strength adapted to absorb higher oxides of nitrogen, and also nitric acid, whereby any $SO_2$ in the gases passing through such Gay-Lussac tower will be promptly oxidized, and thereafter passing the unabsorbed gases to another Gay Lussac treatment.

4. In a process of making sulphuric acid by the use of nitrogen compounds, the herein described step of feeding to a Gay Lussac tower, sulphuric acid of a strength adapted to absorb higher oxides of nitrogen, and also nitric acid, whereby any $SO_2$ in the gases passing through such Gay-Lussac tower will be promptly oxidized, and thereafter washing the gases with aqueous liquid and again with sulphuric acid.

5. In the manufacture of sulphuric acid, the steps of passing the gases discharged from the sulphuric-acid-making part of the plant, first into contact with sulphuric acid of a strength adapted to absorb higher oxides of nitrogen, then washing the gases with a cyclic current of aqueous liquid to which extraneous nitric acid is being added, and again subjecting said gases to the action of aqueous liquid, and then with sulphuric acid capable of absorbing higher oxides of nitrogen.

6. A process which comprises recirculating in contact with gases of a sulphuric acid making plant containing nitrogen oxides and less than 0.2 per cent by volume of $SO_2$, sulphuric acid of a strength capable of absorbing oxides of nitrogen, and also containing nitric acid initially in an amount substantially more than enough to oxidize $SO_2$ in the volume of said gases with which said acid comes into contact during a single contacting with said gases.

7. In the manufacture of sulphuric acid by means of a nitrogen-oxygen compound, the method of recovering oxides of nitrogen from a gas mixture containing the same, which comprises treating such gas mixture simultaneously with nitric acid and with sulphuric acid of a strength adapted to absorb oxides of nitrogen, then treating the unabsorbed gases with aqueous liquid, then treating the unabsorbed gases with sulphuric acid of strength as herein above specified.

8. In the manufacture of sulphuric acid by means of a nitrogen-oxygen compound, the method of recovering oxides of nitrogen from a gas mixture containing the same, which comprises treating such gas mixtures simultaneously with nitric acid and with sulphuric acid of a strength adapted to absorb oxides of nitrogen, then treating the unabsorbed gases with an aqueous liquid containing the nitric acid radical introduced therein from an extraneous source, then treating the unabsorbed gases with sulphuric acid of strength as hereinabove specified.

9. A process for the recovery of nitrogen-oxygen compounds from the gas mixture discharged from an apparatus for the manufacture of sulphuric acid, consisting in contacting such gas mixture, on its way through a series of apparatus for the recovery of nitrogen-oxygen compounds, with a circulating body of liquid containing nitric-acid, sulphuric acid and water, adding to such body of circulating liquid a nitrate of a base, for the purpose of oxidizing residual sulphur dioxide in such gas mixture, substantially as herein described.

10. In the process of recovering nitrogen-oxygen compounds from the gas mixture discharged from an apparatus for the manufacture of sulphuric acid, the step of contacting such gas mixture, on its way through a series of apparatus for the recovery of nitrogen-oxygen compounds, with a circulating body of liquid containing nitric acid and water, combined with the step of adding to such body of circulating liquid a substance containing the nitric acid radical and derived from an extraneous source, for the purpose of oxidizing residual sulphur dioxide in such gas mixture, substantially as herein described.

In testimony whereof I affix my signature.

ANDREW M. FAIRLIE.